(12) United States Patent
Thomas et al.

(10) Patent No.: US 7,128,150 B2
(45) Date of Patent: Oct. 31, 2006

(54) ACID GAS DISPOSAL METHOD

(75) Inventors: Eugene R. Thomas, Houston, TX (US); P. Scott Northrop, Spring, TX (US); Hua Hu, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 269 days.

(21) Appl. No.: 10/234,620

(22) Filed: Sep. 4, 2002

(65) Prior Publication Data

US 2003/0047309 A1 Mar. 13, 2003

Related U.S. Application Data

(60) Provisional application No. 60/318,085, filed on Sep. 7, 2001.

(51) Int. Cl.
*E21B 43/38* (2006.01)
*E21B 43/40* (2006.01)
(52) U.S. Cl. ............... 166/266; 166/265; 166/306; 166/401; 166/402; 405/129.35; 588/250
(58) Field of Classification Search ........... 166/265, 166/266, 267, 268, 269, 306, 105.5, 313, 166/263, 401, 402; 405/129.35; 588/250
See application file for complete search history.

(56) References Cited

U.S. PATENT DOCUMENTS

| | | | | |
|---|---|---|---|---|
| 1,921,358 A | * | 8/1933 | Hill et al. ............... | 166/370 |
| 2,729,291 A | | 1/1956 | Haverfield ................ | 166/7 |
| 2,832,416 A | * | 4/1958 | Allen ...................... | 166/303 |
| 3,215,198 A | | 11/1965 | Willman .................. | 166/9 |
| 3,522,846 A | * | 8/1970 | New ........................ | 166/303 |
| 3,534,528 A | | 10/1970 | Porter ...................... | 55/16 |
| 4,026,355 A | * | 5/1977 | Johnson et al. .......... | 166/246 |
| 4,130,403 A | | 12/1978 | Cooley et al. ............ | 55/16 |
| 4,171,017 A | | 10/1979 | Klass ....................... | 166/266 |
| 4,183,405 A | * | 1/1980 | Magnie .................... | 166/260 |
| 4,241,787 A | | 12/1980 | Price ....................... | 166/105 |
| 4,264,338 A | | 4/1981 | Null ........................ | 55/16 |
| 4,296,810 A | | 10/1981 | Price ....................... | 166/265 |
| 4,344,486 A | | 8/1982 | Parrish .................... | 166/272 |
| 4,353,418 A | * | 10/1982 | Hoekstra et al. ......... | 166/259 |
| 4,372,381 A | * | 2/1983 | McMillen ................ | 166/400 |
| 4,393,936 A | | 7/1983 | Josendal .................. | 166/263 |
| 4,435,191 A | | 3/1984 | Graham ................... | 55/16 |

(Continued)

FOREIGN PATENT DOCUMENTS

EP 0 945 163 A1 9/1999

(Continued)

OTHER PUBLICATIONS

Longworth, H.L., et al., "Underground Disposal of Acid Gas in Alberta, Canada: Regulatory Concerns and Case Histories", Society of Petroleum Engineers, SPE No. 35584, Gas Technology Conference, Calgary, Alberta, pp. 181-188, Apr. 28-May , 1996.

(Continued)

*Primary Examiner*—David Bagnell
*Assistant Examiner*—Shane Bomar

(57) ABSTRACT

This invention is method of recovering gas from a gas-bearing subterranean formation in which gas is produced from an upper portion of the formation and a waste gas is injected into a lower portion of the formation to dispose of the waste gas. The waste gas is injected within a 3000 foot (914 m) radial distance from the production of the gas. The injection and production can be carried out using one well or a plurality of wells.

35 Claims, 6 Drawing Sheets

U.S. PATENT DOCUMENTS

| | | | | |
|---|---|---|---|---|
| 4,466,946 | A | | 8/1984 | Goddin, Jr. et al. ........ 423/228 |
| 4,518,399 | A | * | 5/1985 | Croskell et al. ................ 95/51 |
| 4,561,864 | A | | 12/1985 | Klass et al. ..................... 55/16 |
| 4,635,721 | A | | 1/1987 | Sheffield et al. ............ 166/268 |
| 4,694,906 | A | | 9/1987 | Hutchins et al. ............ 166/294 |
| 4,741,398 | A | | 5/1988 | Goldsberry ................. 166/266 |
| 4,746,430 | A | | 5/1988 | Cooley ................. 210/321.85 |
| 4,765,407 | A | * | 8/1988 | Yuvancic .................... 166/268 |
| 4,767,426 | A | | 8/1988 | Daly et al. ..................... 55/487 |
| 4,781,907 | A | | 11/1988 | McNeill ..................... 423/351 |
| 4,782,901 | A | * | 11/1988 | Phelps et al. ............... 166/402 |
| 4,824,447 | A | | 4/1989 | Goldsberry ................... 55/158 |
| 4,842,718 | A | | 6/1989 | Luteijn et al. .............. 208/308 |
| 5,040,601 | A | * | 8/1991 | Karlsson et al. ............ 166/278 |
| 5,053,058 | A | | 10/1991 | Mitariten ....................... 55/16 |
| 5,096,468 | A | | 3/1992 | Minhas ........................... 55/16 |
| 5,267,614 | A | | 12/1993 | Northrop .................... 166/270 |
| 5,326,458 | A | | 7/1994 | Johnson ...................... 210/122 |
| 5,340,382 | A | | 8/1994 | Beard ........................... 95/151 |
| 5,407,467 | A | | 4/1995 | Lokhandwala et al. ........ 95/49 |
| 5,411,721 | A | | 5/1995 | Doshi et al. ................. 423/220 |
| 5,425,416 | A | | 6/1995 | Hammeke et al. ....... 166/105.5 |
| 5,454,666 | A | | 10/1995 | Chaback et al. .............. 405/52 |
| 5,460,416 | A | * | 10/1995 | Freidrich et al. ........ 285/146.1 |
| 5,673,752 | A | | 10/1997 | Scudder et al. ............. 166/265 |
| 5,693,225 | A | | 12/1997 | Lee ......................... 210/512.2 |
| 5,730,871 | A | | 3/1998 | Kennedy et al. .......... 210/512.2 |
| 5,860,476 | A | | 1/1999 | Kjos .......................... 166/265 |
| 5,913,363 | A | | 6/1999 | Paplinski .................... 166/265 |
| 5,961,841 | A | | 10/1999 | Bowers ...................... 210/739 |
| 6,015,011 | A | | 1/2000 | Hunter ....................... 166/265 |
| 6,039,116 | A | * | 3/2000 | Stevenson et al. .......... 166/263 |
| 6,048,462 | A | * | 4/2000 | Daskopoulos et al. ...... 166/265 |
| 6,053,965 | A | | 4/2000 | Lokhandwala ................. 95/49 |
| 6,128,919 | A | | 10/2000 | Daus et al. .................... 62/624 |
| 6,149,344 | A | | 11/2000 | Eaton ......................... 405/128 |
| 6,221,131 | B1 | | 4/2001 | Behling et al. ................. 95/50 |
| 6,283,204 | B1 | * | 9/2001 | Brady et al. ............. 166/105.5 |
| 6,299,669 | B1 | | 10/2001 | Koros et al. .................... 95/51 |
| 6,321,840 | B1 | * | 11/2001 | Billiter et al. .............. 166/268 |
| 6,325,147 | B1 | * | 12/2001 | Doerler et al. ............. 166/265 |
| 6,352,111 | B1 | | 3/2002 | Bode et al. ................. 166/265 |
| 6,422,313 | B1 | * | 7/2002 | Knight ....................... 166/267 |
| 6,454,836 | B1 | * | 9/2002 | Koelmel et al. ................ 95/46 |
| 6,481,929 | B1 | * | 11/2002 | Layton et al. ......... 405/129.95 |
| 6,502,635 | B1 | | 1/2003 | Underdown et al. ........ 166/267 |
| 6,543,545 | B1 | | 4/2003 | Chatterji et al. ............ 166/381 |
| 6,632,266 | B1 | | 10/2003 | Thomas et al. ................ 95/49 |
| 6,755,251 | B1 | | 6/2004 | Thomas et al. ............. 166/265 |
| 6,929,423 | B1 | * | 8/2005 | Kittle .................... 405/129.95 |
| 2002/0002318 | A1 | * | 1/2002 | O'Rear et al. .............. 585/708 |
| 2002/0104435 | A1 | | 8/2002 | Baker et al. ................... 95/45 |
| 2002/0124722 | A1 | | 9/2002 | Baker et al. ................... 95/45 |
| 2002/0189445 | A1 | | 12/2002 | Miller et al. .................. 95/51 |
| 2003/0024700 | A1 | * | 2/2003 | Cavender ................... 166/278 |
| 2003/0051874 | A1 | | 3/2003 | Munson et al. | |
| 2003/0079876 | A1 | | 5/2003 | Underown | |

FOREIGN PATENT DOCUMENTS

| | | |
|---|---|---|
| WO | WO 96/30625 | 10/1996 |
| WO | WO 98/53031 | 11/1998 |
| WO | WO 00/58603 | 10/2000 |

OTHER PUBLICATIONS

Nieck Edwin Benes, Dissertation entitled "Mass Transport in Thin Supported Silica Membranes", Dec. 21, 2000.

PCT Written Opinion, mailed Aug. 25, 2004 for International Application No. PCT/US02/28111, filed Sep. 5, 2002 (PM 2000. 085), 4 pages.

Response to PCT Written Opinion, mailed Sep. 2004, 3 pages.

PCT International Preliminar Examination Report, mailed Mar. 14, 2005 for International Application No. PCT/US02/28111, Sep. 5, 2002 (PM 2000.085), 4 pages.

International Search Report mailed Apr. 6, 2004, for International Application No. PCT/US02/28111, filed Sep. 5, 2002, 4 pages.

Meyer, H.S. and Gamez, J.P., "Gas Separation Membranes: Coming of Age for Carbon Dioxide Removal from Natural Gas", The 45th Annual Laurance Reid Gas Conditioning Conference, Norman, Oklahoma, pp. 284-306, 1995.

Schell, W.J., Houston, C.D., and Hopper, W.L., "Separation of $CO_2$ from Mixtures by Membrane Permeation", Gas Conditioning Conference, pp. 1-22, 1983.

Chakma, A., "Acid Gas Removal Using Immobilized Liquid Membranes", The 42nd Annual Laurance Reid Gas Conditioning Conference, Norman, Oklahoma, pp. 26-60, 1992.

* cited by examiner

ACID GAS DISPOSAL METHOD

CROSS REFERENCE TO RELATED APPLICATION

This application claims the benefit of U.S. Provisional Patent Application No. 60/318,085 filed Sep. 7, 2001. The application is related to non-provisional application Nos. 10/234,907 and 10/234,920, both filed Sep. 4, 2002, now U.S. Pat. Nos. 6,755,251 and 6,623,266, respectively, which claim the benefit of provisional patent application Nos. 60/318,080 and 60/318,087, respectively, both filed Sep. 7, 2001.

FIELD OF THE INVENTION

This invention relates to a method of disposing of acid gases, and more specifically a process of disposing of acid gases in a subterranean formation.

BACKGROUND

Natural gas is an important fuel gas and it is used extensively as a basic raw material in the petrochemical and other chemical process industries. The composition of natural gas varies widely from field to field. Many natural gas reservoirs contain relatively low percentages of hydrocarbons (less than 40%, for example) and high percentages of acid gases, principally carbon dioxide, but also hydrogen sulfide, carbonyl sulfide, carbon disulfide and various mercaptans. The acid gases are detrimental to hydrocarbon handling and usage, and therefore acid gases are typically removed from the produced hydrocarbons by processes that are well known. The natural gas may also contain inert gases such as nitrogen, which are also removed by methods that are well known. The separated acid gas and inert gas often has insufficient value to justify further treatment or purification for any further commercial usage. "Waste gas" is a term that will used in this patent to describe a gas containing acidic components such as hydrogen sulfide or carbon dioxide, and may or may not contain inert gases. The waste gas typically has little or no commercial value.

Proposals have been made to re-inject the separated waste gas into disposal strata through an injection well directly into a depleted or spent zone of the hydrocarbon-bearing formation from which the gas was produced (see for example U.S. Pat. No. 5,267,614) or re-injected into a separate subterranean strata (see for example U.S. Pat. No. 6,149,344 and World Intellectual Property Organization publication number WO 00/58603). However, the prior art does not address how to simultaneously produce a gas while re-injecting a waste gas into the same formation.

There is a need for an improved method of more efficiently and effectively producing natural gas and at the same time disposing of waste gases into the same formation.

SUMMARY

This invention is a method of recovering gas from a gas-bearing subterranean formation in which gas is produced from an upper portion of the formation and a waste gas is injected into a lower portion of the formation to dispose of the waste gas. The waste gas is injected within a 3000 foot (914 m) radial distance from the production of the gas. The injection and production can be carried out using one well or a plurality of wells.

In one embodiment, a subterranean, gas-bearing formation having one or more production wells are located in the upper portion of the formation, and one or more injection wells are located in the lower portion of the formation, with the horizontal distance between injection through the injection wells and production through any one of the production wells is at least a distance D in which:

$$D = h \tan \theta$$

where:

$$\theta = \operatorname{Arccos}[(0.64 h^{2/3}/R^{1/3} A^{1/3} (k_y/k_h)^{2/3} (I/W)^{1/3}]$$

h is the vertical distance from the bottom of the producing zone of the producing well to the top of the injection zone of the injection well;

R is a recovery factor for the well drainage volume;

A is the drainage area of the production well;

$k_y/k_h$ is the ratio of vertical permeability to horizontal permeability of the formation; and I/W is the ratio of waste gas injection rate to produced gas production rate.

The invention provides a more efficient method for re-injecting produced acid gas (such as carbon dioxide, hydrogen sulfide, carbonyl sulfide, and carbon disulfide) for pressure maintenance of gaseous hydrocarbon-bearing formations and a means for disposing of unwanted acid gas to reduce the environmental impact of releasing the acid gas at the surface.

BRIEF DESCRIPTION OF THE DRAWINGS

The invention and its advantages will be better understood by referring to the drawings in which like numerals identify like functions.

The drawings illustrate specific embodiments of practicing the method of this invention. The drawings are not intended to exclude from the scope of the invention other embodiments that are the result of normal and expected modifications of these specific embodiments.

DETAILED DESCRIPTION

The invention will be described for producing natural gas from a subterranean formation (or reservoir) in fluid communication with one or more production completions and injecting a waste gas for disposal into one or more injection completions in fluid communication with the same formation. The waste gas injection and natural gas production can be carried out using the same well and optionally the injection and production can be carried out using one or more injection wells and one or more spaced-apart production wells. The method of the present invention may be applied to cased or uncased completions. For purposes of the present invention, the term "wellbore" is defined to encompass both cased and uncased completions. In the following description, only cased completions are described, but the invention is not limited to cased completions.

Figure 1:
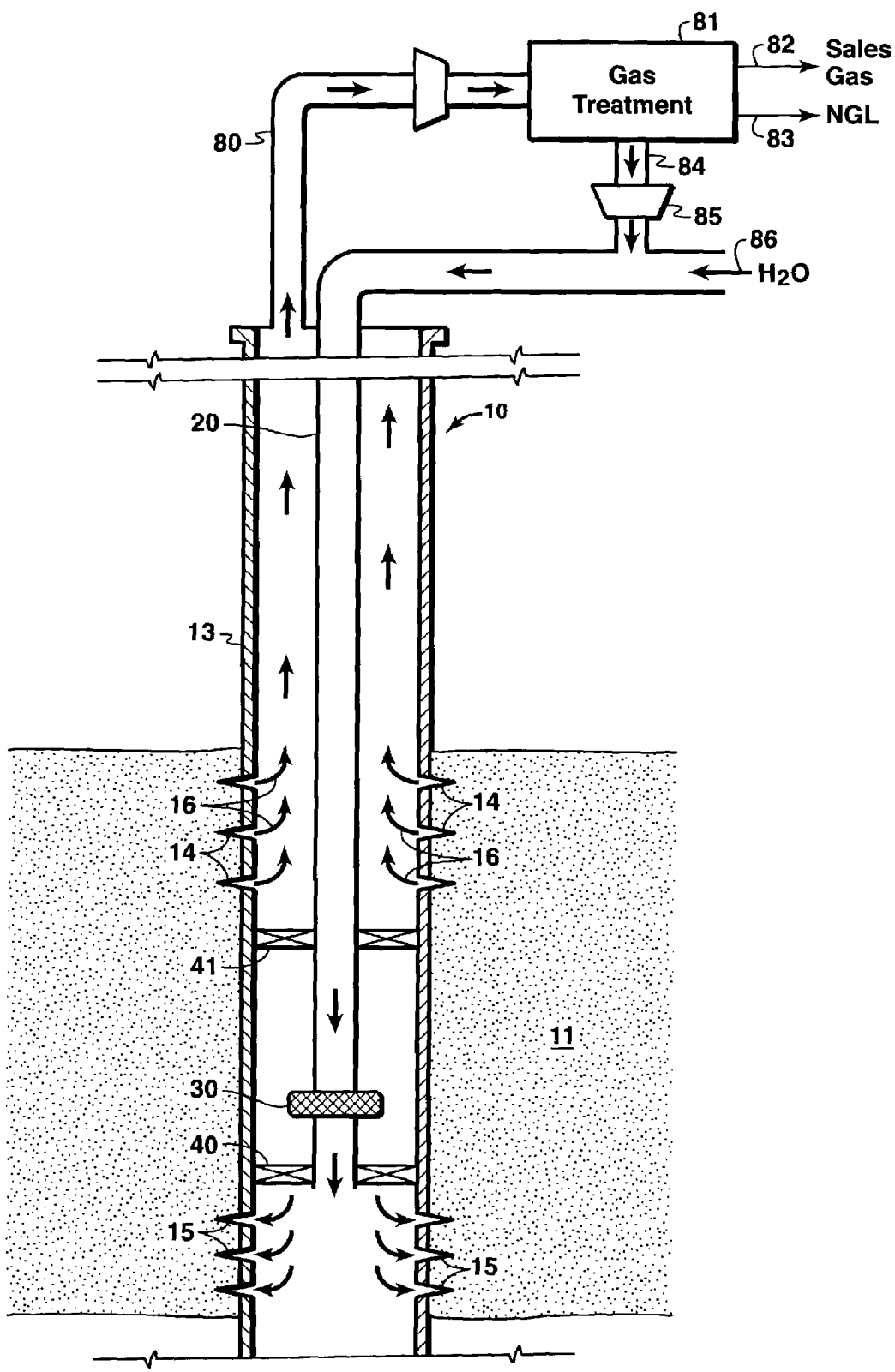
FIG. 1 is a schematic, side-elevation, sectional view of one embodiment of the invention showing production of gas from a subterranean formation and injection of waste gas into the same formation.

Referring to FIG. 1, there is schematically illustrated, in side elevation sectional representation, one embodiment of the invention. A production well 10, which has been drilled by conventional techniques, is shown formed through at least part of production formation 11. Formation 11 is bounded by an overburden and an underburden (not shown). The well 10 has an elongated tubing production casing 13 extending downwardly from the earth's surface (not shown) at least to or near the bottom of production zone 11. The casing is cemented in place (not shown) and is pierced by a plurality of production perforations 14 at the upper part of production zone 11 and a plurality of injection perforations 15 at the lower part of production zone 11 to establish fluid communication between formation 11 and the interior of casing 13. The perforations 14 and 15 can be formed in the casing by conventional perforation techniques. A tubing string 20 is hung inside the casing 13, and extends to near the lower end of production zone 11. The production zone 11 produces natural gas (represented by arrows 16) into the annular space between the casing 13 and tubing string 20. If well 10 is uncased, the gas from formation 11 would flow into the well above the uppermost packer 41 of the well 10. Natural gas flows upwardly in the annular space formed between tubing string 20 and the inside wall of casing 13.

In this patent, the term "natural gas" refers to a multi-component gas obtained from a gas bearing formation (non-associated gas). The composition and pressure of natural gas can vary significantly. A typical natural gas stream contains methane ($C_1$) as a significant component. The natural gas will also typically contain ethane ($C_2$), higher molecular weight hydrocarbons ($C_{3+}$), one or more acid gases, and minor amounts of contaminants such as water, nitrogen, iron sulfide, wax, and crude oil. The term "acid gas" in this description means one or more compounds selected from the group comprising carbon dioxide, hydrogen sulfide, carbonyl sulfide, carbon disulfide, and mercaptans.

Natural gas produced from the upper part of zone 11 passes up the annular space and passes through line 80 to a conventional gas treatment unit 81, which may comprise one or more systems to dehydrate the gas, to remove natural gas liquid, and/or to sweeten the gas by removing acid gases such as $H_2S$ and $CO_2$. All of these treatment systems are well known. The treatment unit 81 may produce (1) a product stream 82 that is suitable for introduction into a gas pipeline, into a fuel line, or it may be passed to a liquefaction plant to produce liquid natural gas (LNG) or pressurized liquid natural gas (PLNG); (2) a natural gas liquid (NGL) stream 83, and (3) a stream 84 enriched in one or more acid gases such as $CO_2$. At least part of stream 84 may be pressurized to a higher pressure by one or more compressors 85 and may be co-mingled with a pressurized stream of water 86 and introduced into tubing string 20.

As the waste gas mixture flows down the tubing string 20, the pressure increases due to the hydrostatic column of fluid. A gas or liquid introduced into a wellbore that is pressurized by its hydrostatic head as the gas or liquid flows downhole may be referred to as undergoing "autocompression." If it is desired that the downhole fluid pressure within tubing string 20 be higher than that generated by the hydrostatic head, the injection pressure at the wellhead can be increased by using a suitable pressurization device such as a pump or compressor 30.

One or more wellbore isolation or sealing devices are used to prevent fluid flowing down tubing string 20 from mixing with the production fluid being produced from production zone 11. These wellbore isolation or sealing devices are commonly referred to as wellbore packers and are located in at least one location between lowermost perforation of perforations 14 and the uppermost perforation of perforations 15. Two packers 40 and 41 are illustrated in FIG. 1, which can be any suitable commercially available retrievable or permanent packers with inflatable or compressible elastomeric sealing elements, as is well known to those skilled in the art. The packer 40 alone or both packers 40 and 41 could be set in an uncased portion of the wellbore without departing from the principles of the present invention.

The injection rate into the lower part of the production zone is preferably controlled to maintain a ratio of the flow rate of waste gas through the tubing string 20 to the flow rate of natural gas being produced to keep the amount of waste gas that "breaks through" to the upper part of the formation and is produced again through perforations 14 below an acceptable level. By keeping the waste gas injection rate lower than the production rate, the waste gases, which will typically have a higher density and viscosity than the produced natural gas, will tend to remain in the lower portion of the production zone 11. A waste gas injection rate that minimizes breakthrough for a given recovery depends on many factors, including the natural gas production rate, the distance between the production perforations 14 and the disposal perforations 15, the vertical permeability of the producing formation relative to its horizontal permeability, the presence (or absence) of natural or induced fractures, the presence (or absence) of shale layers in the formation, and whether the waste gases are mixed with other fluids such as water. In addition, the rate of breakthrough to the production perforations 15 can be reduced through the injection of agents such as foam or polymer solution or other relative-permeability-modifying fluids in the area between the injection and production zones.

Figure 2:
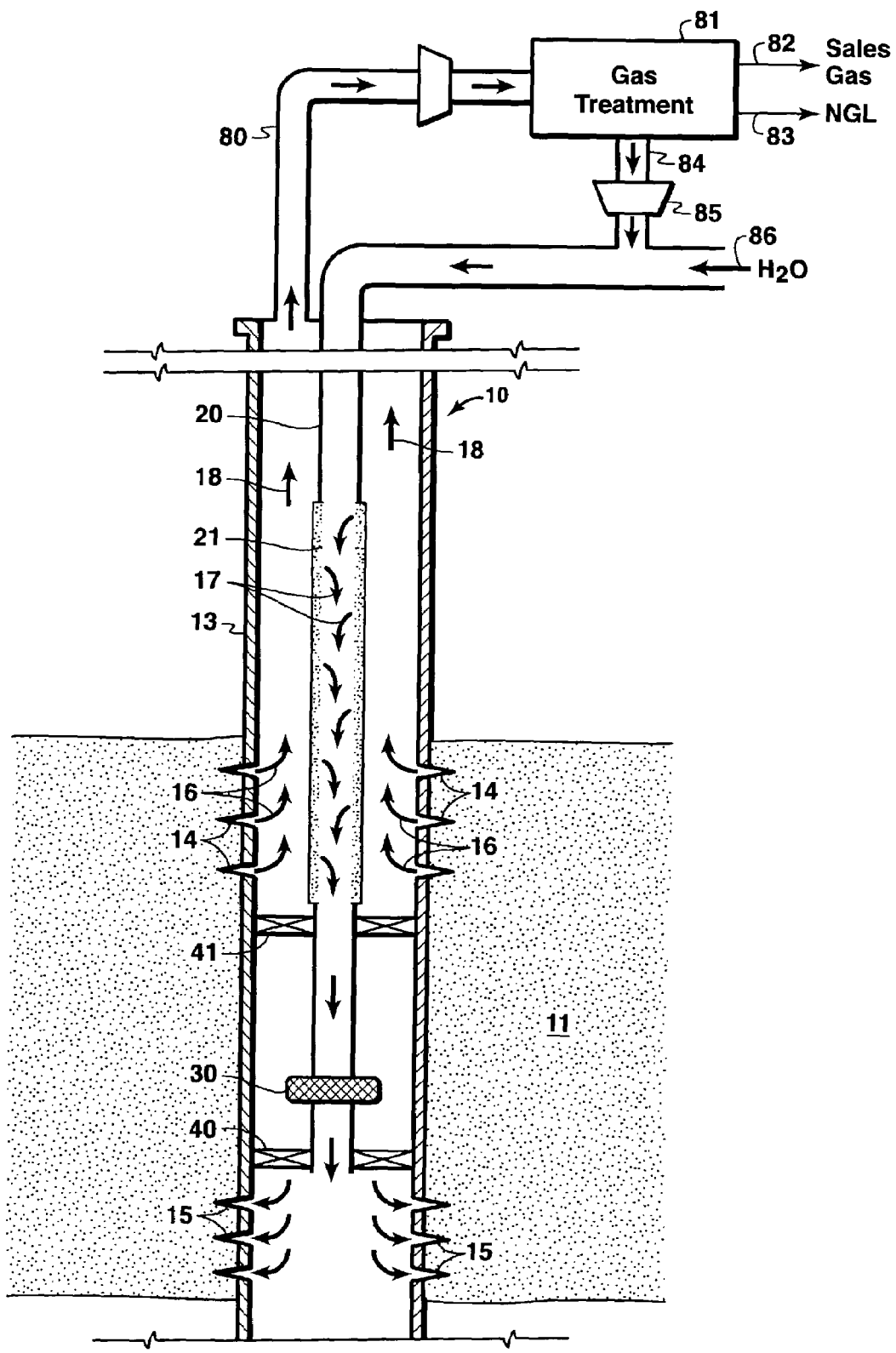
FIG. 2 is a schematic, side-elevation, sectional view of a second embodiment of the invention showing downhole separation of waste gas from produced gas and reinjection of the waste gas into the lower portion of the formation.

FIG. 2 is a schematic side-elevation sectional view of a second embodiment of the invention which is similar to the embodiment illustrated in FIG. 1 except that at least part of the waste gas is separated from a natural gas stream (represented by arrows 16) by one or more downhole membrane modules 21 (only one module is shown in the drawing) and at least some of the waste gas (represented by arrows 17) is passed directly to the lower part of the production zone 11 without being produced to the surface with the natural gas.

Membrane module 21 operates on the principle that a mixture of gases, the natural gas, under relatively high pressure passes across the surface of the membrane that is adapted to act as a selective barrier, permitting some components of the natural gas to pass through more readily than other components. The pressure on the feed side of the membrane is maintained at a pressure sufficiently higher than the pressure on the permeate side of the membrane to provide a driving force for the diffusion of the more permeable components of the gaseous mixture through the membrane. The partial pressure of the more permeable gaseous components is also maintained at a higher level on the feed side of the membrane than on the permeate side by constantly removing both the permeate stream and the residue of the feed stream, the retentate stream, from contact with the membrane. While the permeate stream can represent the desired product, in most permeation processes the desired product is the residue stream, and the permeate stream consists of contaminants which are removed from the feed stream.

Referring to FIG. 2, membrane module 21 selectively permits one or more components of the natural gas, such as an acid gas, to pass to the interior of tubing string 20. The acid-gas-rich permeate stream (represented by arrows 17) is passed to a pump or compressor 30. Pump or compressor 30 can be any suitable pumping system for pressurizing the permeate to a selected pressure to cause the pressurized permeate to flow through injection perforations 15 into the lower part of production zone 11. Preferably, pump or compressor 30 is a hydraulically driven or a submersible electrically driven, multistage pump system.

The retentate (represented by arrows 18) is conveyed to the earth's surface for further treatment by well-known techniques. Those skilled in the art will recognize that if the retentate does not have sufficient velocity to rise to the surface of the wellbore 10, any form of conventional pump or compressor (not shown) may be mounted within the wellbore to pressurize the retentate to a higher pressure. Such upward pumping or compressing apparatus can be carried out by conventional equipment and forms no part of the invention.

Deviated Well

Figure 3:
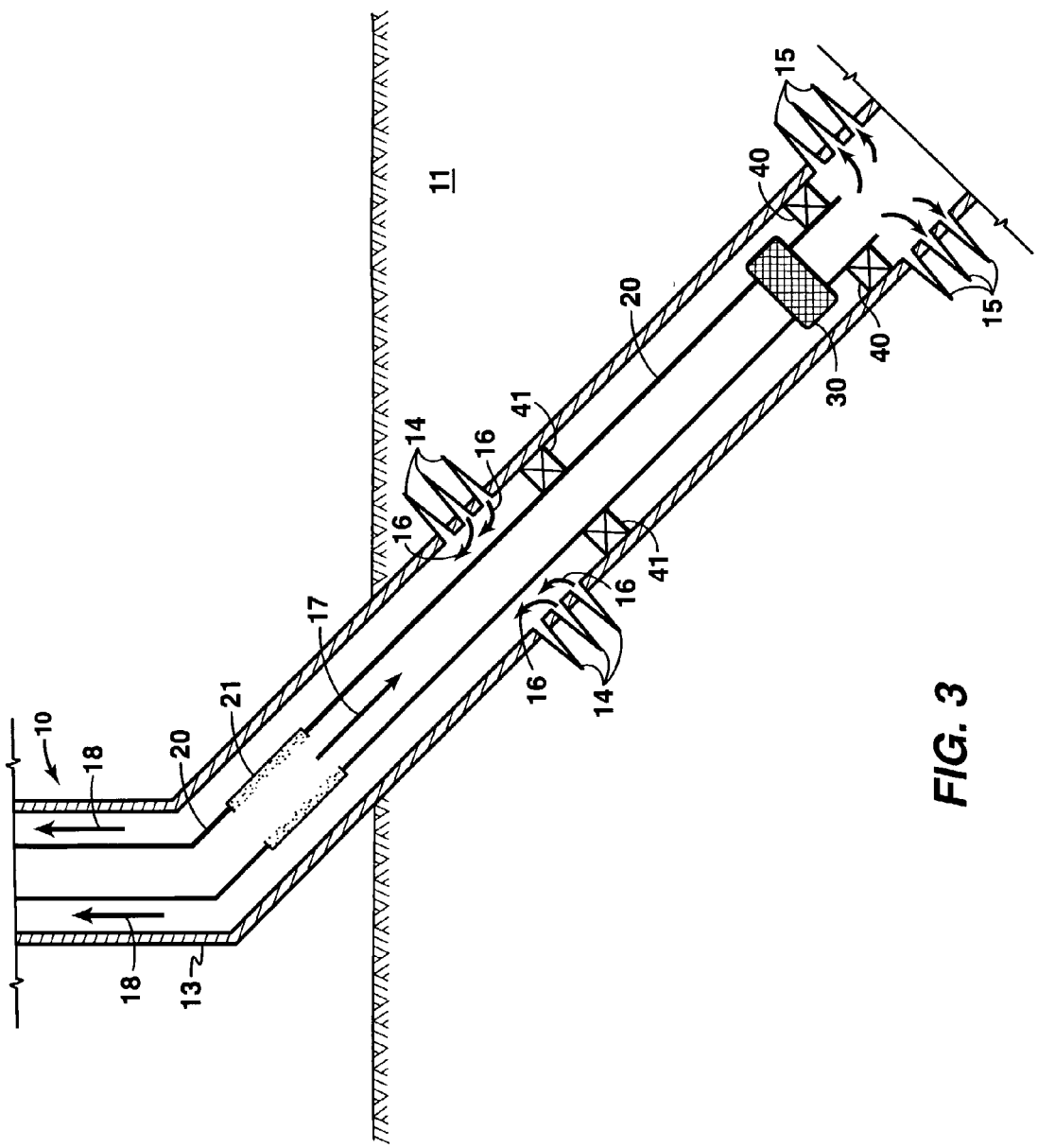
FIG. 3 is a schematic, side-elevation, sectional view of a third embodiment of the invention, similar to the embodiment shown in FIG. 2, showing practice of the invention in a deviated wellbore.

Although wells illustrated in FIGS. 1 and 2 are shown as being vertical, in the practice of this invention the wells can also be deviated, as shown in FIG. 3, and such deviation can approach 90 degrees, in which case the well will have a horizontal portion. Alternatively, a multi-lateral well design (not shown in the drawings) may be used in the practice of the present invention in which the production of gas and injection of waste gas are in separate legs of the multi-lateral system. The productivity of a well typically increases as the length of the completion intersecting production perforations increases. The well 10 may also be a multi-lateral well (not shown in the drawings) in which one or more branch wells may be drilled to enhance production of natural gas and to enhance disposal of waste gas. Positioning of the branch wellbore paths and the number of paths to use typically depends on many factors that would be familiar to those skilled in the art having benefit of the teachings of the present invention, including the specific geology of the formation as well as the amount and rate of natural gas to be produced from the formation and the amount and rate of waste gas to be disposed into the formation.

Multiple Wells

Although FIGS. 1 and 2 illustrate production of natural gas from one well and disposal of a waste gas into the same formation from the same well, more than one well can be used in the practice of this invention. For example, the natural gas can be produced from a production well and waste gas can be injected in a spaced-apart injection well. Analogous to the case in which one wellbore is used for simultaneous production and re-injection, the production and injection locations can be proximal to each other such that (a) the injector well provides pressure support to the producer well and (b) the injection pattern provides a gravity stable (primarily) vertical displacement of the natural gas by the waste gas. For the purposes of this description of the invention, "proximal" is defined to be less than 3000 feet (914 m) well spacing, preferably less than 2000 feet (610 m).

For most applications of the present invention, the following conditions exist: (1) the waste gas is more dense and more viscous than the raw natural gas it is displacing, (2) in most reservoirs, the vertical permeability is significantly less than the horizontal permeability, and (3) the amount of waste gas for disposal is appreciably less than the volume of gas to be produced. Thus, by injecting the waste gas at controlled rates as deep as practical in the reservoir perforations, the injected waste gas can displace the formation gas (the "displaced gas") upward toward the producing well or wells. Although not shown in the drawings, the waste gas may optionally be cooled prior to injection into the formation. The cooling of the waste gas increases its density and reduces the likelihood of early breakthrough of the waste gas to the producing perforations. The density of the waste gas can also be increased by mixing the waste gas with water prior to injection into the formation, thereby providing further gravity segregation. The greater the density difference between the injectant and displaced gas, the better the stability of the displacement process. A density ratio of $\rho_{inj}/\rho_{disp} > 1.05$ is preferred, with a ratio of above 1.2 being more preferred. Likewise, a more viscous injectant is more stable in terms of fingering through the displaced fluid. A viscosity ratio of the injected waste gas to the gas being displaced in the reservoir ($\mu_{inj}/\mu_{disp}$) greater than 1.05 is generally preferred with a ratio above 1.1 being more preferred.

Proximal injection of the waste gas will help maintain the reservoir pressure, improve reservoir sweep efficiency, and mitigate potential subsidence of the formation 'above the reservoir. Maintaining higher average reservoir pressure may reduce the number of production wells needed over the life of the project and/or reduce or eliminate the need for compressors on the production wells.

Persons skilled in the art will recognize that high waste gas injection and/or rates of natural gas production may cause a high pressure gradient to develop between the injector perforations and production perforations. This pressure gradient can lead to "coning" of the injected waste gas toward the production perforations. This can be mitigated by a number of factors, including for example:

1. Distribution of $k_v/k_h$. If the ratio of vertical permeability ($k_v$) to horizontal permeability ($k_h$) is less than 0.3, substantial radial displacement of the injectant will occur, and improve overall reservoir sweep efficiency. Areally extensive permeability barriers (such as shale streaks) can reduce the likelihood of early breakthrough, but also reduce the benefit of pressure support of the injectant to the upper producing layers. The ratio $k_v/k_h$ is dictated by the reservoir and cannot be globally changed. However, injection and production wells may be placed more judiciously if the distribution of $k_v/k_h$ can be estimated by methods known to those skilled in the art. This will improve the sweep efficiency of the upward displacement process.
2. Reducing the injection/withdrawal ratio in the local area. A maximum of 0.7 was used for the simulations discussed later in this description. Lower values of injection/withdrawal ratios lead to less contamination, but also to less overall pressure support. Alternatively, injection can be delayed to some time after production has commenced.
3. Increasing the vertical distance between the injection and production perforations.
4. Increasing the horizontal displacement between the injection and production perforations.
5. Injecting water, foam, polymer solution, or other fluid agent in the perforations between the injection perforations and the production perforations. These agents can be used to reduce the relative permeability of the waste gas in the affected zone, forcing the waste gas to take a longer path to the production perforations.

Figure 4:
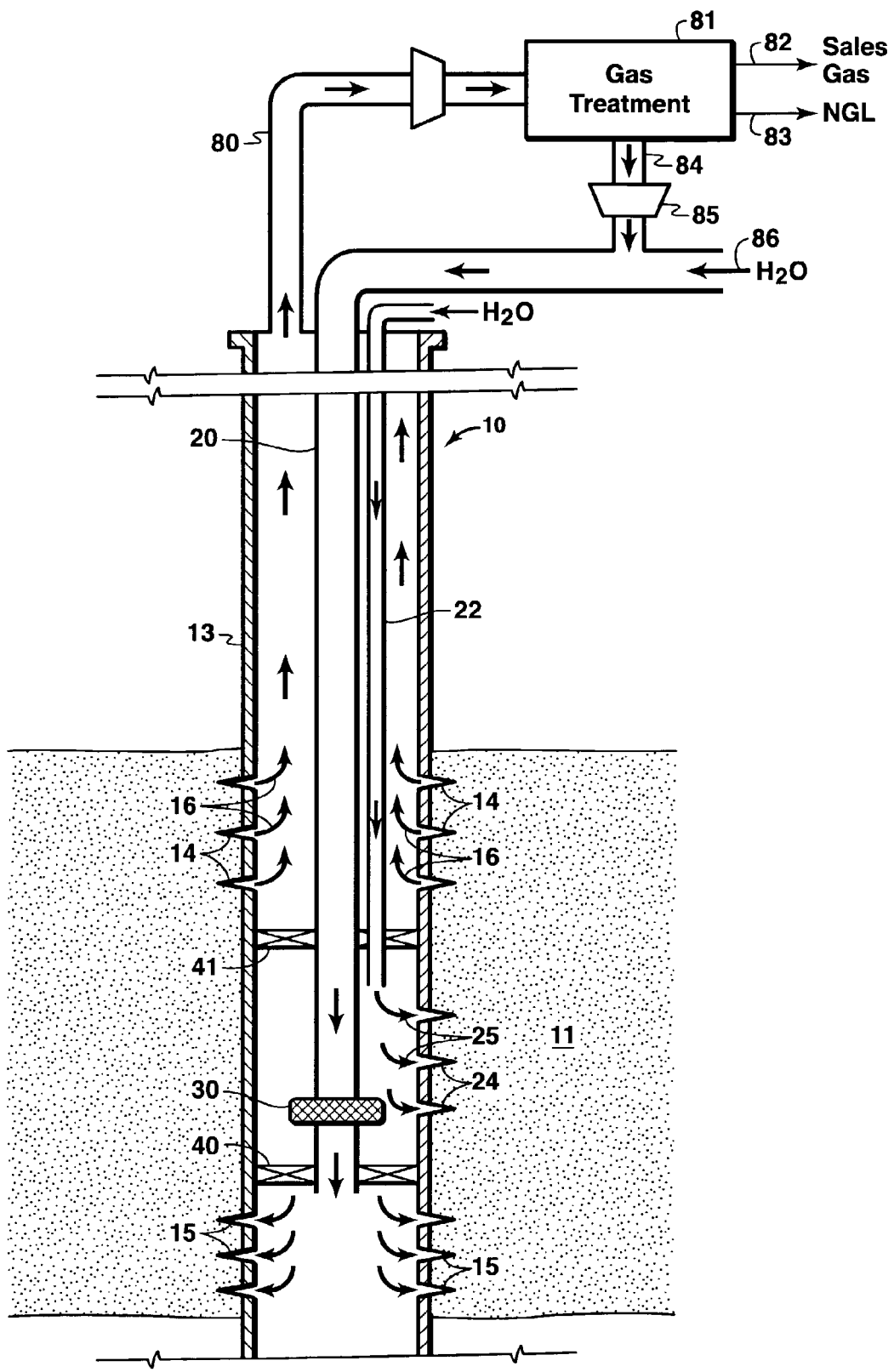
FIG. 4 is a schematic, side-elevation, sectional view of a fourth embodiment of the invention, similar to the embodiment shown in FIG. 1, showing injection of water into the formation between the production and injection perforations.

FIG. 4 schematically illustrates another embodiment of the present invention, similar to the embodiment depicted in FIG. 1, except that a suitable fluid line 22 is placed in the well 10 to transport water, foam, a polymer solution, or other suitable permeability-altering agent (generally depicted by arrows 25) into the formation 11 through perforations 24. Such injected fluid can reduce the relative permeability of the waste gas that is injected into the lower part of the formation 11, thereby causing the waste gas to take a longer path before reaching the production perforations 14. The placement of a suitable permeability-altering fluid into the formation between the injection perforation and production perforations is not limited to the apparatus depicted in FIG. 4. The permeability-altering fluid can be placed in the formation 11 by any suitable fluid transport mechanism.

FIGS. 1–4 illustrate flow configurations in well 10 in which produced gas flows up the annular space between the casing 13 and tubing string 20; however, other flow configurations are possible. For example, produced gas may be directed to flow through one or more tubing strings in the well. Such alternative flow arrangements would be familiar to those skilled in art having benefit of this disclosure.

Model

A geometric model was developed to estimate the minimum distance from the bottom of producing portion of the well to the top of injection portion of the well for the single wellbore case that reduces breakthrough to a desired level. The model assumed substantially uniform porosity throughout the gas-bearing formation. If the reservoir is not sufficiently thick to accommodate in a single well both gas production and waste gas injection with a desired vertical distance between the injection and production zones, a deviated well (or separate wells) can be used. For such a reservoir it is desirable to determine the minimum horizontal distance between the top perforation of the injection perforations and the bottom perforation of the producing perforations. This horizontal distance (D) can be calculated by using the following equation:

$$D = h \tan \theta$$

where:

$$\theta = \mathrm{Arccos}[(0.64 h^{2/3}/A^{1/3} R^{1/3} (k_v/k_h)^{2/3} (I/W)^{1/3}] \qquad \mathrm{Eq.\ 1}$$

h is the vertical distance from the bottom of the producing perforations to the top of the injection perforations;

A is the approximate drainage area of the producing well—defined as $\pi r^2$ where r is half the distance from the perforations in the reference production well to the perforations in another producing well (if there are no other production wells in the same formation then r is set equal to the average horizontal distance from the production perforations to the reservoir boundary);

R is a recovery factor for the producing well drainage volume—defined as the gas produced in a given well divided by the original gas in place (OGIP) for its drainage volume (V) where V=A*T, T=average reservoir thickness, OGIP=$V\Phi(1-S_{1W})/B_g$, $\Phi$=average porosity, $S_{1W}$=interstitial water saturation factor, and $B_g$=gas formation factor;

$k_v/k_h$ is the ratio of average vertical permeability to average horizontal permeability in the drainage volume of the well; and I/W is the ratio of waste gas injection rate to formation gas production rate.

Preferably, each production well is in fluid communication with the upper portion of the formation, each injection well is in fluid communication with the lower portion of the formation, and all or at least a substantial portion of the waste gas injected through a selected injection well is stored outside the drainage volume of the production well closest to the selected injection well.

Figure 5:
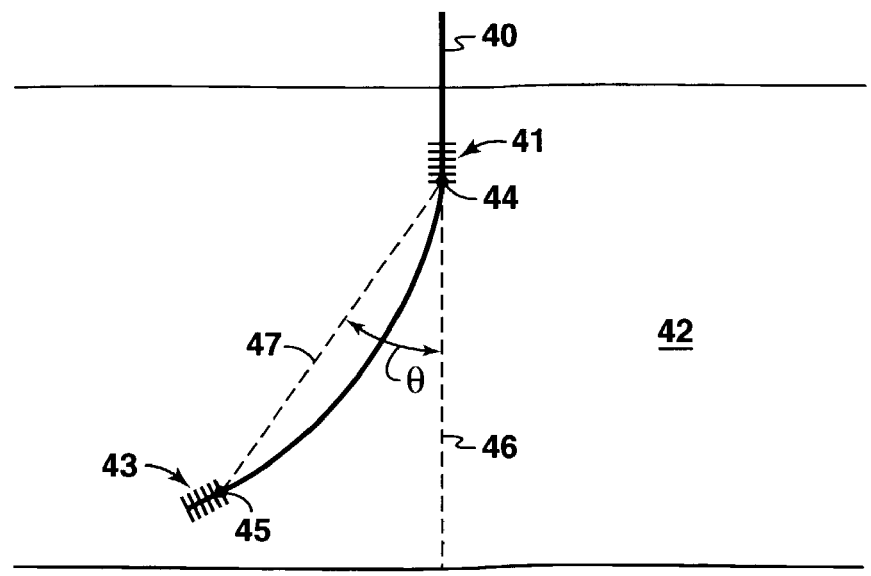
FIG. 5 schematically illustrates a deviated well that penetrates a subterranean formation showing angle theta (θ) that is used in calculating minimum horizontal distance between injection of gas into a reservoir and the production of gas from the reservoir.

FIG. 5 schematically illustrates angle theta $\theta$ for a single wellbore 40 containing production perforations 41 near the top of a producing reservoir 42, as well as injection perforations 43 near the bottom of the producing reservoir. At the bottom of production perforations 41 is a point 44, and at the top of injection perforations 43 is a point 45. Angle theta $\theta$ is the angle between the vertical dotted line 46 which extends down from point 44, and the straight dotted line 47 which joins points 44 and 45, regardless of the path the wellbore may take in joining points 44 and 45.

Figure 6:
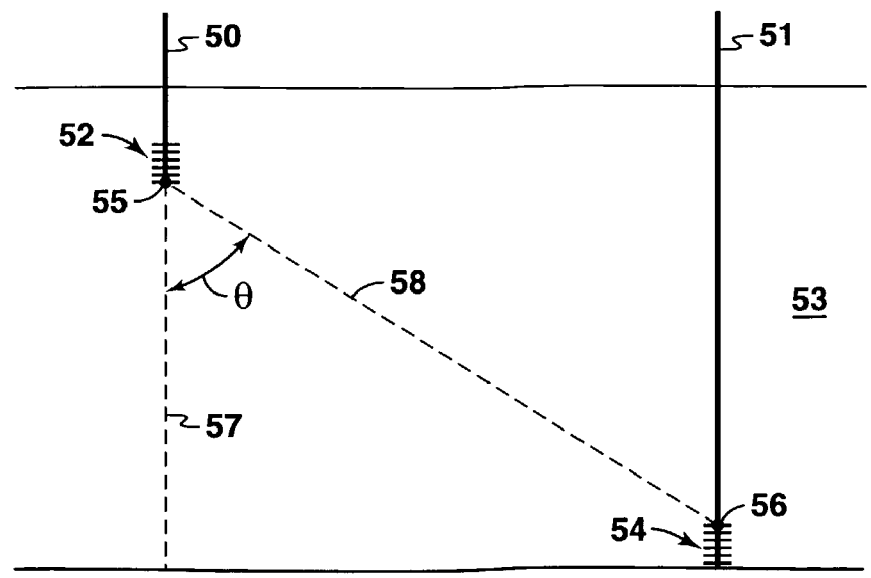
FIG. 6 schematically illustrates a production well and an injection well that penetrate a subterranean formation showing angle theta (θ) that is used in calculating minimum horizontal distance between the gas injection perforations of the injection well and the producing perforations of the production well.

FIG. 6 schematically illustrates angle theta $\theta$ for an embodiment of the present invention which uses a production well 50 and an injection well 51. Reservoir 53 is penetrated by producing well 50 that contains production perforations 52 near the top of the reservoir 53. Reservoir 53 is also penetrated by a spaced-apart injection well 51 having injection perforations 54 near the bottom of the reservoir 53. At the bottom of production perforations 52 is designated as point 55, and at the top of injection perforations 54 is designated as point 56. In this embodiment, $\theta$ is the angle between the dotted vertical line 57 that extends down from point 55, and the dotted straight line 58 joining points 55 and 56.

In the case that the expression in the brackets of Eq. 1 is equal to or greater than one, no deviation of the reservoir is necessary. Therefore, injection of waste gas can be through injection perforations on a vertical line below the production perforations. Table 1 sets forth a range of values of $\theta$ for selected reservoir and operational parameters assuming nominally constant porosity across the reservoir and assuming that both the production perforations and injection perforations are 100 vertical feet thick. It will be understood by those skilled in the art the invention is not limited by the assumptions used to calculate the data set forth in Table 1.

The minimum interwell distance between vertical wells tends to scale with drainage area, and increases with larger $k_v/k_h$ and injection/withdrawal ratio. The producing well perforations are preferably located near the top of the continuous production perforations, with the injection well perforations preferably being located near the bottom of reservoir just above (or possibly below) the gas-water contact. If natural fracturing is present in the gas-bearing formation, the waste gas injectors are preferably located in a direction from the producer wells that is normal to the fracture direction.

Exceeding the suggested value of θ will typically increase the drilling costs in the single wellbore embodiment, since total drill well length will be increased. Exceeding θ may also reduce the level of pressure support gained by proximal injection, depending on reservoir permeability. The expression of Eq. 1 provides a means of balancing long-term production contamination, reservoir pressure support, and well costs.

TABLE 1

| Area (hectares) | kv/kh | (I/W) | Interwell Thickness (m) | Total Thickness (m) | Recovery 30% Theta (degrees) | Recovery 50% Theta (degrees) |
|---|---|---|---|---|---|---|
| 50 | 0.1 | 0.3 | 50 | 150 | 38.2 | 48.5 |
| 50 | 0.1 | 0.3 | 75 | 175 | 0.0 | 19.2 |
| 50 | 0.1 | 0.3 | 150 | 250 | 0.0 | 0.0 |
| 50 | 0.3 | 0.3 | 100 | 200 | 46.6 | 54.6 |
| 50 | 0.3 | 0.7 | 200 | 300 | 25.3 | 40.3 |
| 50 | 0.3 | 1 | 200 | 300 | 36.6 | 47.4 |
| 50 | 0.3 | 1 | 300 | 400 | 0.0 | 22.6 |
| 100 | 0.1 | 0.3 | 50 | 250 | 58.3 | 63.7 |
| 100 | 0.1 | 0.3 | 100 | 300 | 8.0 | 33.4 |
| 100 | 0.1 | 0.3 | 150 | 350 | 0.0 | 0.0 |
| 100 | 0.3 | 0.3 | 200 | 400 | 30.1 | 43.1 |
| 100 | 0.3 | 0.7 | 200 | 400 | 49.3 | 56.6 |
| 100 | 0.3 | 1 | 300 | 500 | 36.3 | 47.1 |
| 100 | 0.3 | 1 | 400 | 600 | 0.0 | 31.4 |
| 200 | 0.1 | 0.3 | 50 | 250 | 65.3 | 69.4 |
| 200 | 0.1 | 0.3 | 100 | 300 | 38.2 | 48.5 |
| 200 | 0.1 | 0.3 | 150 | 350 | 0.0 | 19.2 |
| 200 | 0.3 | 0.3 | 300 | 500 | 17.0 | 36.3 |
| 200 | 0.3 | 0.7 | 300 | 500 | 43.9 | 52.6 |
| 200 | 0.3 | 1 | 400 | 600 | 36.6 | 47.4 |
| 200 | 0.3 | 1 | 500 | 700 | 17.5 | 36.5 |
| 300 | 0.1 | 0.3 | 100 | 300 | 46.6 | 54.6 |
| 300 | 0.1 | 0.3 | 150 | 350 | 12.0 | 34.4 |
| 300 | 0.1 | 0.3 | 200 | 400 | 0.0 | 0.0 |
| 300 | 0.3 | 0.3 | 300 | 500 | 33.4 | 45.2 |
| 300 | 0.3 | 0.7 | 400 | 600 | 37.8 | 48.2 |
| 300 | 0.3 | 1 | 500 | 700 | 33.6 | 45.4 |
| 300 | 0.3 | 1 | 600 | 800 | 17.0 | 36.2 |

EXAMPLE

Reservoir simulations were performed using proprietary software. Comparable results can be obtained from commercially-available reservoir simulators familiar to those skilled in the art using the teachings of this description. A single producer/injector combination (similar to the embodiment depicted in FIG. 1) was modeled in a 8900-foot (2,713 m) diameter, 4700-foot (1,433 m) thick cylindrical reservoir volume. In this example case, the reservoir was divided into 72 layers, with the horizontal permeability being fixed at 30 millidarcies (0.0296 μm$^2$), unless otherwise noted. A vertical to horizontal permeability ratio ($k_v/k_h$) of 0.33 was assumed for all of the runs, unless otherwise stated. A porosity of 20% was likewise assumed. The initial reservoir gas composition was taken to be 72% $CO_2$ and 28% $CH_4$ (percentages in mole percent). Initial reservoir pressure was 6800 psi (46,900 kPa) at the top of the perforations. Production was taken from the upper layers of the reservoir, at a fixed flow of 200 million standard cubic feet per day (9,962 kg mole/hr), with an assumed project life of 50 years.

For the purposes of the simulation example, it was assumed that 95% of the $CO_2$ was recovered and reinjected, along with 3% of the $CH_4$. The volume of waste gas ($CO_2$) increased in later years of the model, as the concentration of $CO_2$ increased in the production stream. This waste gas was injected over a 1050-foot (320 m) perforations in the bottom portion of the reservoir.

Figure 7:
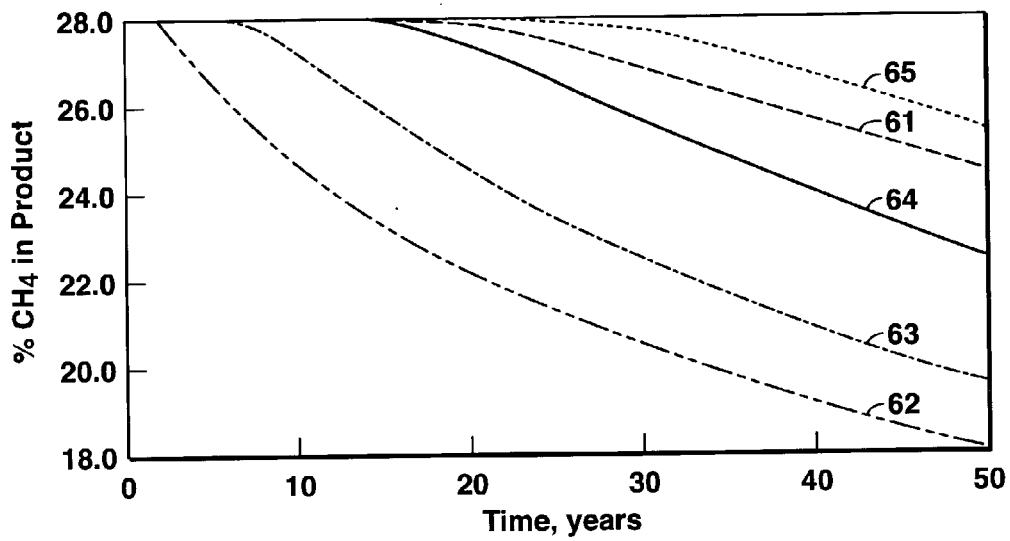
FIG. 7 graphically illustrates the results of five reservoir simulation examples showing the mole percent $CH_4$ in produced gas as a function of time.

FIG. 7 compares calculated $CH_4$ mole percent in the produced gas as a function of time for several different simulation examples. For reference, the base case (curve 61) had the bottom producing well block 1574 feet (480 m) above the top of the uppermost injection well block.

Curve 62 illustrates the effect of shortening the perforations between injector and producer, by lowering the latter to 525 feet (160 m) above the injector, without any horizontal displacement. Thus, θ is zero, which is substantially below the recommended value of 72° for a recovery factor of 0.5. The resulting level of contamination is undesirable.

Curve 63 shows that increasing the $k_v/k_h$ ratio to 1.0 substantially increases contamination, or reduces the time required to attain a given level of contamination. Curve 64 shows a case where the volume of gas injected was increased by 50% over the base case, with all other parameters fixed. Again, earlier contamination of the produced gas is evident. Curve 65 shows a case where the injector was moved 1667 feet (508 m) in the horizontal direction away from the producer. Less contamination of the produced gas was calculated because of the additional distance that the waste gas must traverse to get to the producer.

Figure 8:
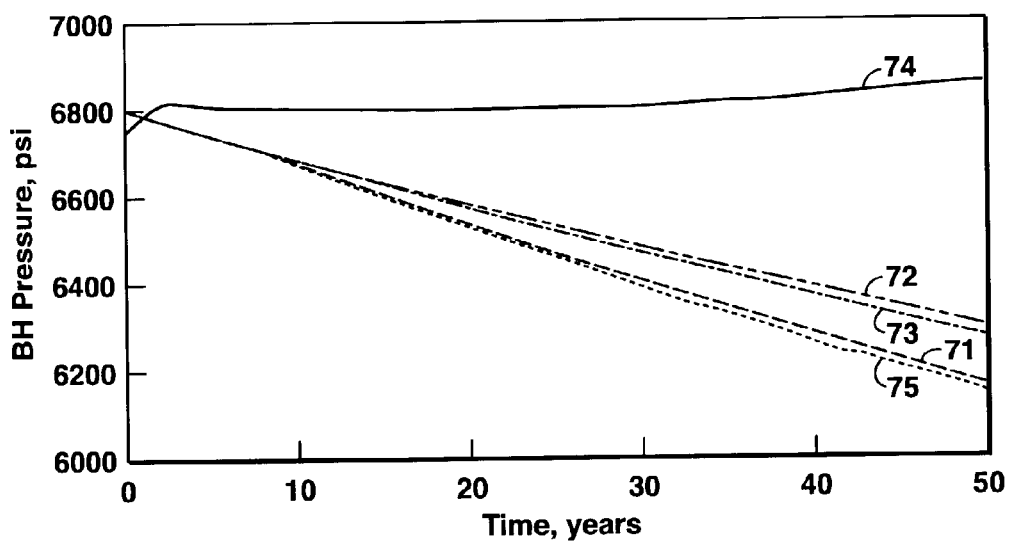
FIG. 8 graphically illustrates the results of five reservoir simulation examples showing well bottom hole pressures as a function of time.

FIG. 8 shows producing well bottom hole (BH) pressures corresponding to the cases shown in FIG. 7. Curve 71 shows the base case (corresponding to curve 61 in FIG. 7). Curve 72 appears to shows some increase in bottom hole pressure by moving the producer closer to the injector.

Curve 73 shows that increasing the $k_v/k_h$ ratio to 1.0 also improves pressure support of the producer. Curve 74 shows that injecting more waste gas in the model significantly increased production well pressure over the life of the project. Curve 75 shows that little loss in pressure support is observed when the injector is moved as far as 1667 feet (508 m) in the horizontal direction away from the producer.

A person skilled in the art, particularly one having the benefit of the teachings of this patent, will recognize many modifications and variations to the specific embodiment disclosed above. For example, a variety of temperatures and pressures may be used in accordance with the invention, depending on the overall design of the system, whether a downhole membrane separation system is used and if so the membrane system selected, the desired component separations, and the composition of the feed gas. One skilled in the art can also recognize potential improvements to the process, for example, by producing gas from the formation for a certain time period before beginning waste gas injection. Likewise, one skilled in the art can understand the benefit of arranging the wells in a certain pattern for a given type of reservoir. For example, if the producing formation is anticlinal, the production of hydrocarbons may be from a plurality of production wells positioned generally in the interior portion of the formation, while the waste gas injection wells can be placed generally at the peripheral region of the formation. Alternatively, if the formation is monoclinal, the production of hydrocarbons may be from a plurality of production wells that are placed in the updip portion of the formation, while the placement of acid gas may be through a plurality of injection wells placed in the downstructure portion of the formation in a line-drive configuration. In cases where the reservoir is partially depleted, and wells are already in place, it may be desirable in some circumstances to convert production wells into injection wells. Additionally, certain process steps may be accomplished by adding devices that are interchangeable with the devices shown.

As discussed above, the specifically disclosed embodiments and examples should not be used to limit or restrict the scope of the invention, which is to be determined by the claims below and their equivalents.

What we claim is:

1. A method of recovering gas from a gas-bearing subterranean formation comprising:
    a) producing gas from an upper portion of the formation; and
    b) injecting a waste gas into a lower portion of the formation to dispose of the waste gas, said waste gas being injected within a 3000 foot (914 m) radial distance from the production of the gas.

2. The method of claim 1 where the production of gas is through one or more production wells and the injection of waste gas is through one or more spaced-apart injection wells.

3. The method of claim 2 wherein each production well is in fluid communication with the upper portion of the formation, and each injection well is in fluid communication with the lower portion of the formation and a substantial portion of the waste gas injected through a selected injection well is stored outside the drainage volume of the production well closest to the selected injection well.

4. The method of claim 2 wherein at least one of the one or more injection wells is a deviated well.

5. The method of claim 1 wherein the steps of producing gas and the injection of waste gas are carried out within one or more wells.

6. The method of claim 1 wherein the produced gas is produced through a production zone of a well and the injection of waste gas is through an injection zone of the well, and the horizontal distance between the top of the injection zone and the bottom of the production zone being at least distance D in which $$D = h \tan \theta$$

where:

$$\theta = \text{Arccos} \left[ (0.64 h^{2/3}/A^{1/3} R^{1/3} (k_v/k_h)^{2/3} (I/W)^{1/3} \right]$$

h is the vertical distance from the bottom of the production zone to the top of the injection zone;
R is a recovery factor for the well drainage volume;
A is the drainage area of the well;
$k_v/k_h$ is the ratio of vertical permeability to horizontal permeability of the formation; and
I/W is the ratio of waste gas injection rate to produced gas production rate.

7. The method of claim 2 in which one or more production wells are placed in the upper portion of the formation, and one or more injection wells are placed in the lower portion of the formation, with the horizontal displacement between the injection through any one of the injection wells and the production through any one of the production wells being at least a distance D in which $$D = h \tan \theta$$

where:

$$\theta = \text{Arccos} \left[ (0.64 h^{2/3}/R^{1/3} A^{1/3} (k_v/k_h)^{2/3} (I/W)^{1/3} \right]$$

h is the vertical distance from the bottom of the producing zone of the producing well to the top of the injection zone of the injection well;
R is a recovery factor for the well drainage volume;
A is the drainage area of the production well;
$k_v/k_h$ is the ratio of vertical permeability to horizontal permeability of the formation; and
I/W is the ratio of waste gas injection rate to produced gas production rate.

8. The method of claim 1 wherein the produced gas is natural gas.

9. The method of claim 8 wherein the natural gas comprises an acid gas.

10. The method of claim 9 wherein the acid gas is at least one of carbon dioxide and hydrogen sulfide.

11. The method of claim 9 further comprises removing at least part of the acid gas from the natural gas and using the removed acid gas as the source of waste gas for injection into the subterranean formation.

12. The method of claim 9 wherein the acid gas is injected into the formation simultaneously with production of the natural gas from the formation.

13. The method of claim 1 in which the relative permeability of the waste gas is reduced in the region of the formation above injection of the waste gas into the formation by injecting a fluid agent into the formation immediately above the injection of waste gas into the formation.

14. The method of claim 13 wherein the fluid agent is water.

15. The method of claim 13 wherein the fluid agent is foam.

16. The method of claim 1 wherein the viscosity ratio of the injected waste gas to the produced gas ($\mu_{inj}/\mu_{disp}$) is greater than 1.05.

17. The method of claim 1 wherein the density ratio of the injected waste gas to the produced gas ($\rho_{inj}/\rho_{disp}$) is greater than 1.05.

18. A method of recovering hydrocarbons from a subterranean formation, comprising:
    a) producing the hydrocarbons from the upper portion of the formation, the hydrocarbons comprising an acid gas;
    b) separating the acid gas from the hydrocarbons; and
    c) placing at least a portion of the separated acid gas into the lower portion of the formation, wherein said acid gas placement helps maintain the formation pressure.

19. The method of claim 18 wherein the separation of acid gas is performed in a well into which the hydrocarbon is produced.

20. The method of claim 18 wherein the separation of acid gas is performed after the hydrocarbon is passed to the earth's surface.

21. The method of claim 18 wherein the acid gas and hydrocarbons are produced into a well, the acid gas is separated from the hydrocarbons in the well, and the separated acid gas is placed into the lower portion of the formation from the same well.

22. The method of claim 19 wherein the well is deviated.

23. The method of claim 22 in which the deviated well contains production perforations through which the hydrocarbons are produced and injection perforations through which acid gas is placed into the lower portion of the formation, and the horizontal distance between the top of the injection perforations and the bottom of the production perforations being less than 3000 feet (914 in).

24. The method of claim 23 wherein the horizontal distance between the top of the injection perforations and the bottom of the production perforations is less than 2000 feet (610 m).

25. The method of claim 23 further comprising injecting into the formation between the top of the acid gas injection perforations and the lower end of the production perforations a permeability reducing agent to reduce the relative permeability of the acid gas in the region between the acid gas injection perforations and hydrocarbon production perforations.

26. The method of claim 25 in the permeability-reducing agent is water.

27. The method of claim 25 in the permeability-reducing agent is foam.

28. The method of claim 18 wherein the hydrocarbons are produced into a first well and the acid gas is placed into the lower portion of the formation from a second well.

29. The method of claim 16 in which the relative permeability of the acid gas is reduced in the region of the formation above injection of the acid gas into the formation by injecting a fluid agent into the formation immediately above the injection of acid gas into the formation.

30. The method of claim 29 in which the fluid agent is water.

31. The method of claim 29 in which the fluid agent is foam.

32. The method of claim 18 wherein the hydrocarbons are produced from the formation for a desired period of time prior to commencement of acid gas placement into the formation.

33. The method of claim 18 in which the formation is anticlinal and the production of hydrocarbons is from a plurality of production wells positioned generally in the interior portion of the formation and the placement of acid gas into the formation is from a plurality of injection well that are placed generally at the peripheral region of the formation.

34. The method of claim 18 in which the formation is monoclinal and production of hydrocarbons is from a plurality of production wells that are placed in the updip portion of the monocline formation, and placement of acid gas is through a plurality of injection wells placed in the downstructure portion of the formation in a line-drive configuration.

35. The method of claim 18 in which the formation is already partially depleted by existing production wells, and in which some of said existing wells are converted to injection wells.

* * * * *